United States Patent
McBreen et al.

(10) Patent No.: US 7,451,474 B1
(45) Date of Patent: Nov. 11, 2008

(54) SET TOP NETWORK PROTOCOL

(75) Inventors: James R. McBreen, Shoreview, MN (US); Lance A. Balut, Maple Plain, MN (US)

(73) Assignee: Unisys Corporation, Blue Bell, PA (US)

( * ) Notice: Subject to any disclaimer, the term of this patent is extended or adjusted under 35 U.S.C. 154(b) by 768 days.

(21) Appl. No.: 09/570,872

(22) Filed: May 15, 2000

(51) Int. Cl.
*H04N 7/173* (2006.01)

(52) U.S. Cl. ....................... 725/116; 725/114

(58) Field of Classification Search ............ 725/93, 725/94, 95, 96, 97, 114, 116, 86, 87
See application file for complete search history.

(56) References Cited

U.S. PATENT DOCUMENTS

| | | | |
|---|---|---|---|
| 5,555,244 A | 9/1996 | Gupta et al. ............... 370/60.1 |
| 5,570,355 A | 10/1996 | Dail et al. .................. 370/60.1 |
| 5,583,561 A | 12/1996 | Baker et al. ..................... 348/7 |
| 5,612,735 A | 3/1997 | Haskell et al. ................. 348/43 |
| 5,619,256 A | 4/1997 | Haskell et al. ................. 348/43 |
| 5,623,308 A | 4/1997 | Civanlar et al. ............ 348/392 |
| 5,668,841 A | 9/1997 | Haskell et al. ................ 375/371 |
| 5,673,265 A | 9/1997 | Gupta et al. ................. 370/432 |
| 5,675,573 A | 10/1997 | Karol et al. .................. 370/230 |
| 5,691,768 A | 11/1997 | Civanlar et al. ............ 348/392 |
| 5,699,362 A | 12/1997 | Makam ....................... 370/437 |
| 5,710,829 A | 1/1998 | Chen et al. .................. 382/173 |
| 5,724,349 A | 3/1998 | Cloonan et al. ............. 370/390 |
| 5,724,543 A | 3/1998 | Ozden et al. ................ 395/441 |
| 5,740,176 A | 4/1998 | Gupta et al. ................. 370/440 |
| 5,742,343 A | 4/1998 | Haskell et al. .............. 348/415 |
| 5,751,704 A | 5/1998 | Kostic et al. ................. 370/335 |
| 5,754,773 A | 5/1998 | Ozden et al. ............ 395/200.33 |
| 5,764,803 A | 6/1998 | Jacquin et al. .............. 382/236 |
| 5,781,320 A | 7/1998 | Byers ......................... 359/123 |
| 5,799,017 A | 8/1998 | Gupta et al. ................. 370/419 |
| 5,809,022 A | 9/1998 | Byers et al. ................. 370/395 |
| 5,826,110 A | 10/1998 | Ozden et al. ................ 395/865 |
| 5,842,111 A | 11/1998 | Byers ......................... 455/6.3 |
| 5,847,751 A * | 12/1998 | Safadi ......................... 725/119 |
| 5,850,218 A * | 12/1998 | LaJoie et al. ................. 725/45 |
| 5,867,155 A | 2/1999 | Williams .................... 345/327 |
| 5,956,716 A * | 9/1999 | Kenner et al. ................. 707/10 |
| 2003/0066085 A1* | 4/2003 | Boyer et al. ................. 725/104 |

OTHER PUBLICATIONS

Tanenbaum, "Computer Networks", 3rd Ed, 1996, pp. 413-416 and 526-529.*
Definition of "Set Top Box", Sep. 5, 2001, from Whatis.com <http://whatis.techtarget.com>.*
Microsoft Computer Dictionary Definitions of "Set Top Box" and "World Wide Web", pubished in 1997.*

* cited by examiner

*Primary Examiner*—Chris Kelley
*Assistant Examiner*—Usha Raman
(74) *Attorney, Agent, or Firm*—Charles A. Johnson; Robert Marley; Nawrocki, Rooney, & Sivertson, PA

(57) ABSTRACT

A method of and apparatus for efficiently communicating between a provider of video on demand services and a cable television subscriber. The communication is implemented using a message protocol specifically optimized to communicate between a multimedia application server and a set top subscriber box. The message format includes unique identifiers for addressing and synchronization to permit the multimedia application server to manage the communication process.

2 Claims, 15 Drawing Sheets

| CODE | FUNCTION |
|---|---|
| 1 | Power Up |
| 2 | Message |
| 3 | Power Down |
| 4 | Acknowledge |
| 5 | Reinitialize |

FIG. 15

SET TOP NETWORK PROTOCOL

CROSS REFERENCE TO CO-PENDING APPLICATIONS

This application is related to commonly assigned and co-pending U.S. patent application Ser. No. 09/304,907, filed May 4, 1999 and entitled "Video on Demand Transaction Server"; U.S. patent application Ser. No. 09/304,906, filed May 4, 1999, and entitled "Video Server"; all of which are incorporated by reference.

BACKGROUND OF THE INVENTION

1. Field of the Invention

The present invention generally relates to digital data transmission of video information and more particularly to the delivery of user selected video information to subscribing users.

2. Description of the Prior Art

The mass distribution of video programming signals (i.e., television) was originally accomplished primarily by the broadcasting of a very high frequency (i.e., VHF) carrier containing an amplitude modulated video signal and a frequency modulated audio signal. Through the addition of more broadcasting transmitters, a modest number of different programming signals could be simultaneously distributed to a large number of potential users with a modest capital commitment. Using this technique, the capital commitment increases almost linearly with number of different programming channels within the limits of the available spectrum space for separate and independent carriers.

Within a couple of decades, most of the scarce VHF spectrum space had been committed, and increasing demand for additional programming channels resulted in the allocation of spectrum space in the ultra-high frequency (i.e., UHF) region. Whereas virtually all receivers became UHF compatible, as a matter of policy, and UHF channels were assigned to requesters, it was appreciated that there were no economies of scale through the addition of more broadcast programming channels.

The cable television channel era was the result, wherein a capital commitment was required to wire each user home within a service area. As a result, about one hundred separate programming channels became readily available at a lesser cost than providing the same number of channels using conventional broadcast means. Initially, cable television was simply an analog system in which low power modulated carriers were transferred over a coaxial cable rather than being broadcast into the ether at substantially higher power levels. The cost saving was realized because the broadcasting was accomplished at substantially lower power.

With approximately one hundred different programming channels, it is typical to charge cable service user fees in accordance with a hierarchy of programming channels. The least expensive channels tend to be the preexisting broadcast channels and those cable channels supported primarily by advertisers which are intended for the most general audiences. The subscriber fees to access other channels increase as the programming becomes more specialized, advertising revenue becomes less likely to pay the programming costs, and the programming materials tend to have substantial economic value through other distribution channels. The so-called "premium channels" which show current and/or near current movies without advertising are typical of the higher cost programming options.

Most commercial cable television providers package the various programming channels into programming channel groups with different prices such that a given user can select a suitable programming package and pay the equivalent fee. Typically, a cable provider box, which couples the user television receiver to the coaxial cable source, is controlled by the cable television provider to give access to a given user to only those channels for which the appropriate subscriber fee has been paid.

The most expensive cable television channels currently available are "pay-per-view" or PPV. With the PPV concept, a given user can subscribe to a given programming channel for a single individual program of up to several hours for a separate subscriber fee. Typically, PPV channels provide sporting events and almost current movies.

Perhaps the major disadvantage of the PPV concept as currently implemented, is that the programming is provided in the "broadcast" mode. That means that the programming begins and runs on a predefined schedule. As a result, programming is missed if the user receives a telephone call, for example, during the viewing. Furthermore, it ordinarily requires the user to allocate viewing time to coincide with the predefined schedule. To overcome this disadvantage, many users rent video programs as video cassette recordings (i.e., VCR) from commercial stores which provide such a rental service. This permits the viewer to watch the program in accordance with her/his own schedule, stop the program during interruptions, and replay portions of the program which may not be readily understood. The primary disadvantage of the VCR rental approach is the need to physically go to the rental store to obtain the program and return to the rental store to return the recording.

With the capital commitment for cable television in place, their appear to be substantial new uses for the basic coaxial pathway. Such uses include, telephone, computer modem, facsimile, and video conferencing. To properly coordinate such diverse information transmission activities, attention is being directed to digital transmission schemes which provide for easier management of the distribution resources. U.S. Pat. No. 5,570,355, issued to Dail et al., discusses the handling of a number of diverse information transmissions within a single system. U.S. Pat. No. 5,673,265, issued to Gupta et al., U.S. Pat. No. 5,754,773, issued to Ozden et al., and U.S. Pat. No. 5,799,017, issued to Gupta et al., all discuss multi-media distribution systems. U.S. Pat. No. 5,555,244, issued to Gupta et al., is directed to multimedia distribution to residential users.

The digitization of video results in a great deal of data which must be transferred at a high rate to yield acceptable performance and resolution. By current standards, 3 mbits/sec. is considered to be a very acceptable rate. Such high data rates require systems which can provide high data rate transmission. U.S. Pat. No. 5,724,543, issued to Ozden et al., U.S. Pat. No. 5,699,362, issued to Makam, and U.S. Pat. No. 5,826,110, issued to Ozden et al., all concern themselves with high data rate retrieval and transmission. U.S. Pat. No. 5,675,573, issued to Karol et al., discusses the management of high data rate bandwidths.

In addition to retrieval and transmission of the required high data rates, there is also the need to provide high speed switching for switching as between data sources and destinations. U.S. Pat. No. 5,751,704, issued to Kostic et al., and U.S. Pat. No. 5,740,176, issued to Gupta et al., discuss high speed digital switching systems.

Whether it is data storage and retrieval, data transmission, or data switching, the fundamental technological problem associated with digital video results from the sheer volume of digitized video data and the tremendous rate at which it must be provided to the ultimate user for satisfactory performance. One technique for reduction of the volume problem is in reducing the resolution (and hence the volume of data) for those applications for which such reduction is acceptable. U.S. Pat. No. 5,623,308 and U.S. Pat. No. 5,691,768, both issued to Civanlar et al., directly address the handling of multiple resolution digitized video signals within a single system.

Notwithstanding attempts to reduce the resolutions to the lowest acceptable levels, the total data volume of any commercially useful system will remain high. The most common way to treat extremely high data volumes is through data compression. U.S. Pat. No. 5,710,829, issued to Chen et al., U.S. Pat. No. 5,742,343, issued to Haskell et al., and U.S. Pat. No. 5,619,256, issued to Haskell et al., are concerned with digital compression techniques. Specific attention to compression of digitized video is found in U.S. Pat. No. 5,764,803, issued to Jacquin et al. Compression of 3-dimensional images is treated by U.S. Pat. No. 5,612,735, issued to Haskell et al.

The evolving techniques of digitized video transmission have resulted in a transmission standard, called Asynchronous Transfer Mode (ATM). U.S. Pat. No. 5,668,841, issued to Haskell et al., describes data transmission using the ATM standard. An ATM converter is discussed in U.S. Pat. No. 5,809,022, issued to Byers et al. U.S. Pat. No. 5,724,349, issued to Cloonan et al., suggests an approach to packet switching within an ATM system. An ATM architecture is discussed in U.S. Pat. No. 5,781,320, issued to Byers. Interfacing to ATM systems is addressed in U.S. Pat. No. 5,842,111, issued to Byers.

A solution to the PPV problems noted above utilizing digitized video has been termed, Video on Demand (or VOD). In a VOD system, digitized video programming is made available to individual cable television subscribers in response to specific requests made by the user. U.S. Pat. No. 5,867,155, issued to Williams, describes the use of VOD for a very specialized application. Sea Change, International, has proposed a VOD approach for cable television subscribers. U.S. Pat. No. 5,583,561, issued to Baker et al., assigned to the assignee of the present invention and incorporated herein by reference, discloses and teaches a complete, modern VOD system employing a centralized architecture utilizing an enterprise server developed by Unisys Corporation.

To fully utilize VOD for commercially useful subscriber levels, substantial administrative message traffic is required between the subscribers and the central controlling site(s). For current PPV, this typically takes the form of telephone communication with the subscriber. This is acceptable for PPV only because the total programming selections and timing are so limited. However, VOD on demand so increases the options available to the subscriber, such manual attention is impractical.

SUMMARY OF THE INVENTION

The present invention overcomes many of the disadvantages found within the prior art by providing a video on demand system which separates the tasks of supplying video to subscribers from the tasks associated with managing the subscriber interface. The subscriber message interfaces can thus be automated such that most administrative matters are easily handled without operator attention. A message protocol is provided which enables the system to properly sequence and manage the message traffic.

The key to this approach is to provide an architecture in which the necessary functions are divided into two separate portions. A first hardware and software subsystem, called a video server, is specifically dedicated to retrieving and transmitting the stream of video information. Virtually no other functions are performed by the video server. A second hardware and software subsystem, called the transaction server, handles virtually all other functions including control interface with the subscribers, digitized video data storage, subscriber accounting, etc. In accordance with the present invention, the transaction server automatically manages message traffic with the subscribers using the preferred protocol.

The video server has two primary design criteria. First, it must be highly optimized to handle the extremely high input/output data rates. In essence, this is the sole function of the video server, and therefore, the design of the video server hardware and software are most directed towards this characteristic. Because the role of the video subsystem is simplified and single dimensional, video subsystems utilizing current technology can be produced at a surprisingly low cost.

The second major design criterion of the video server subsystem involves modularity. The addition of active subscribers, each viewing individual video programs (or the same program at different times), tends to increase the total input/output load of the video server subsystem linearly. Therefore, there is great economic incentive to design the video server subsystem in such a manner that the hardware resources to implement the video subsystem may be linearly increased in relatively small (and inexpensive) increments. In the preferred mode of the present invention, the video server subsystem consists of one or more input/output data rate optimized, industry compatible computers operating under a readily available, commercial operating system, such as Windows NT. Using 3 mbits/second per video stream as a standard, each such device can effectively service thousands of different and independent video streams. Within each video server, storage can be added to handle more video programs and communication interfaces can be added to provide more video streams. Therefore, the same design architecture and components are suitable for a wide range of system sizes, and the capital cost to the video programming supplier can be readily determined as further subscribers are added to the system.

Unlike the video server subsystem which is optimized to provide a low cost, highly modular approach to a single function, the transaction server is optimized to provide a low cost approach to a wide and highly expandable variety of functions. In fact, all of the functions of the video on demand system, except for the video streaming function performed by the video server, are accomplished by the transaction server. Typical tasks include: transactional interface with the subscribers, subscriber fee accounting, requested program storage, video server subsystem control, receiving video from a satellite and storing it in an archive, etc. Thus, the ideal hardware/software platform for implementation of the transaction server is a readily expandable, highly flexible, high availability, highly recoverable, realtime oriented mainframe system. In the preferred mode of the present invention, the Unisys 2200 is used to host the transaction server.

In accordance with the present invention, a subscribing user transfers a programming request to the transaction server. The transaction server makes the required subscriber accounting entry and notifies the corresponding preloaded video server platform of the new subscriber request. If the asset is not preloaded, in addition to the subscriber accounting, the transaction server must access the request video program and spool it for the video server. Depending upon the rate of use of the requested video program, the data might be stored in memory (for high volume use), on a disk or other mass storage device (for medium volume use), or in some other medium (for low volume use).

In the preferred mode of the present invention, the user is permitted to pause, reverse, or fast forward the requested video program though commands entered from the set top subscriber box. These functions are intended to appear similar to normal VCR commands to the user. These commands are sent to the transaction server which utilizes them to control the corresponding video stream output of the video server subsystem. Thus the user is provided with all of the advantages of VCR rental without the need to physically transport the medium (i.e., cassette tape) back and forth between the rental store and the user site.

In view of the power and flexibility of the transaction server, other diverse but somewhat related functions may be provided. For example, a user might order a pizza delivery via the set top subscriber box to transaction server interface, or the user might access the internet, e-mail, or faxes via the transaction server. If this interface is implemented over a readily available, publically accessible, network, such as the internet, many additional functions are possible.

As can be readily appreciated, the volume of message traffic between the subscribers and the transaction server can become substantial in order to implement these functions. Furthermore, it is necessary for the transaction server to manage these message, because the set top subscriber box at the subscriber site is typically a rather "dumb" device having limited or no programmability. The preferred embodiment of the present invention employs the basic UDP protocol for data transfers between the set top subscriber box and the transaction server. However, in order to properly manage the large number of messages, each is tagged with a sequence number and set top subscriber box address. These messages also contain a function code which identifies the basic content of the message and indicates whether a particular message needs to be acknowledged.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 15 is a table of the defined function codes.

DETAILED DESCRIPTION OF THE PREFERRED EMBODIMENTS

Figure 1:
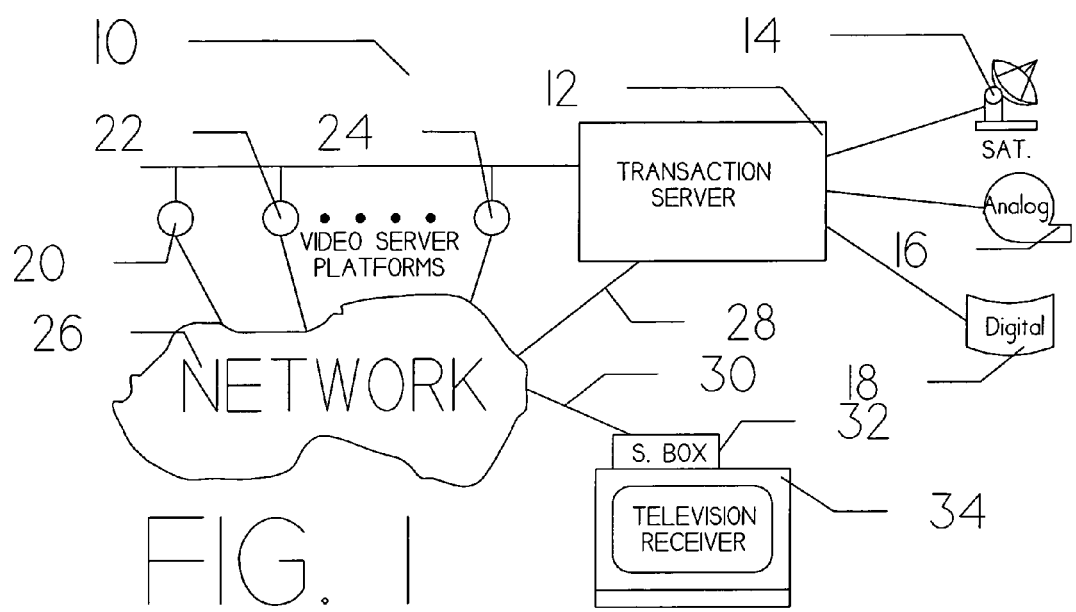
FIG. 1 is a schematic diagram showing the operation of the overall video on demand system of the present invention.

FIG. 1 is a schematic diagram 10 showing the overall video on demand system of the present invention. A subscribing user (not shown) is positioned adjacent standard television receiver 34. Through this television receiver, the user is capable of viewing video programming material transferred to his location via coaxial cable 30 from network 26 in the fashion currently known in the cable television industry. The interface between coaxial cable 30 and standard television receiver 34 is provided by set top subscriber box 32, which provides the conversion between MPEG-2 digitized video format and the analog video signal required by television receiver 34.

In many respects, set top subscriber box 32 is similar to the set top subscriber boxes utilized with existing cable television systems with the slight functional differences described in more detail below. The basic reason for these slight differences is to permit a subscribing user to communicate with transaction server 12 in a two directional manner. Not only does set top subscriber box 32 receive video programming data via coaxial cable 30 and present it to television receiver 34, but set top subscriber box 32 is capable of transferring user requests via coaxial cable 30 and network 26 to transaction server 12 via path 28. The most important requests in accordance with the present invention are those which initiate and control the individualized video on demand programming.

When the user is interested in viewing a particular video program, a request is made from set top subscriber box 32 and transferred to transaction server 12 via coaxial cable 30, network 26, and path 28. Transaction server 12, a Unisys 2200 system in the preferred embodiment, is provided access to video programming information from satellite receiver 14, from analog video storage 16 and digital mass storage 18. In each instance, the video programming data is either received in digital form or converted to digital form. According to the preferred embodiment of the present invention, the MPEG-2 standardized format is utilized.

Whenever a request is received, transaction server 12 checks various security parameters, makes appropriate subscriber billing entries, and generally performs all of the necessary administrative functions as described below in greater detail. Additionally, transaction server 12 stores digital video data for transmission by the video server assigned to the requesting subscriber. One of video server platforms 20, 22 . . . , or 24 is assigned the task by transaction server 12 and the stored digital video data is supplied via the digital data bus shown. In the preferred mode of the present invention, each video server platform is a separate industry compatible, Windows NT based, computer platform. Once transferred to the selected video server, the requested video programming is transmitted via network 26 and coaxial cable 30 to set top subscriber box 32 and television receiver 34.

Figure 2:
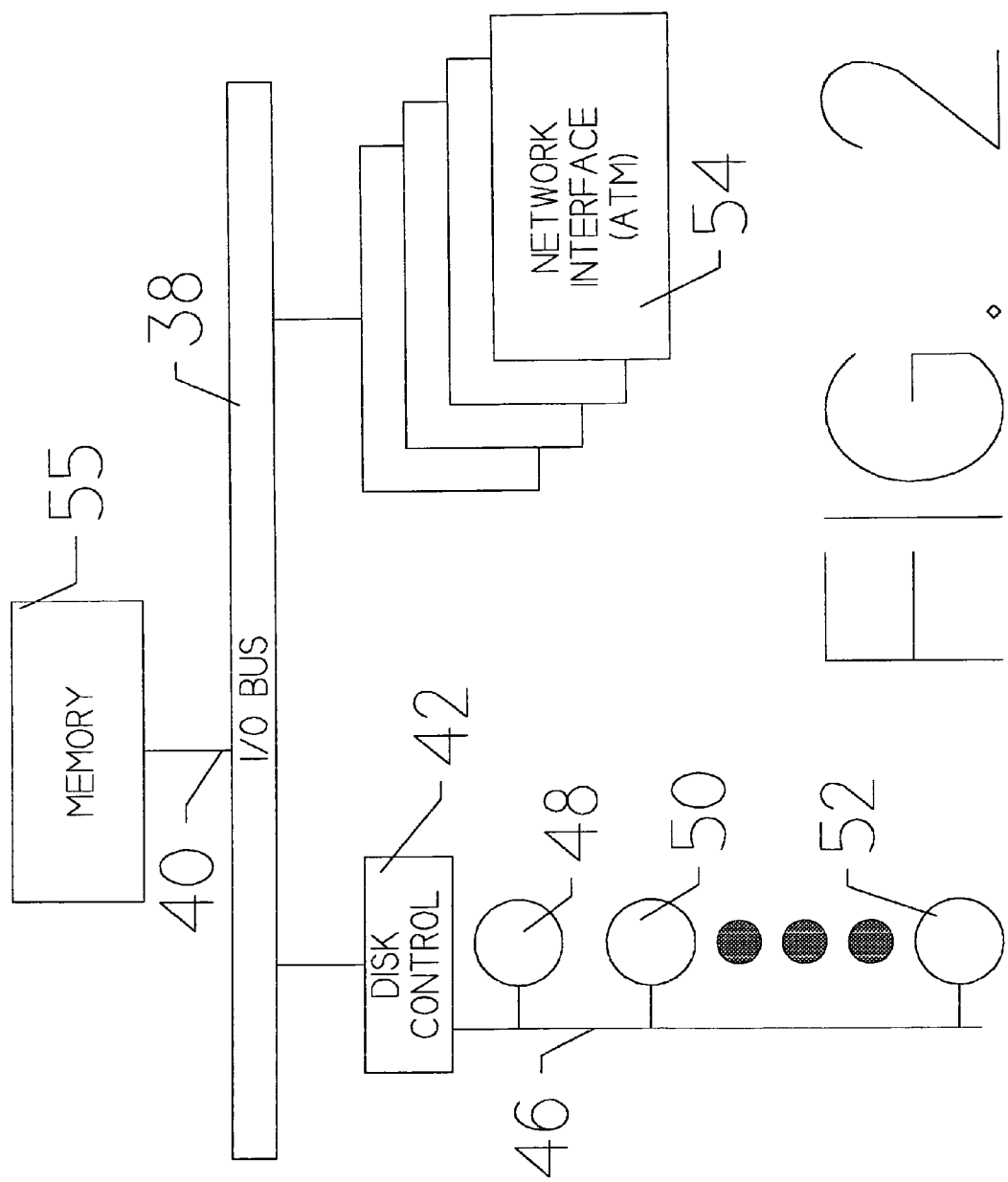
FIG. 2 is a schematic diagram showing spooling of the video programming data from typical mass storage devices.

FIG. 2 is a schematic diagram showing the spooling of data from digital disk mass storage devices. For the preferred mode of the present invention, the digitized video programming data is stored in MPEG-2 format. In the spooling process, the MPEG-2 organized and placed into memory as a programming file 55. To produce commercially acceptable video, 3 mbits/second is required. That means that a two hour video program requires the about 2.7 billion bytes of data storage. Because of cost considerations, many of the programs having low and moderate usage will best be stored on mass storage disk until requested Individual storage disks 48, 50, . . . , and 52 each store a number of video programs in MPEG-2 format. As requested, this data is transferred via storage bus 46 through disk control 42 through I/O bus 38 and placed in memory as program file 55 via path 40. A software program spools the data to the ATM interface 54 at the required speed.

Figure 3:
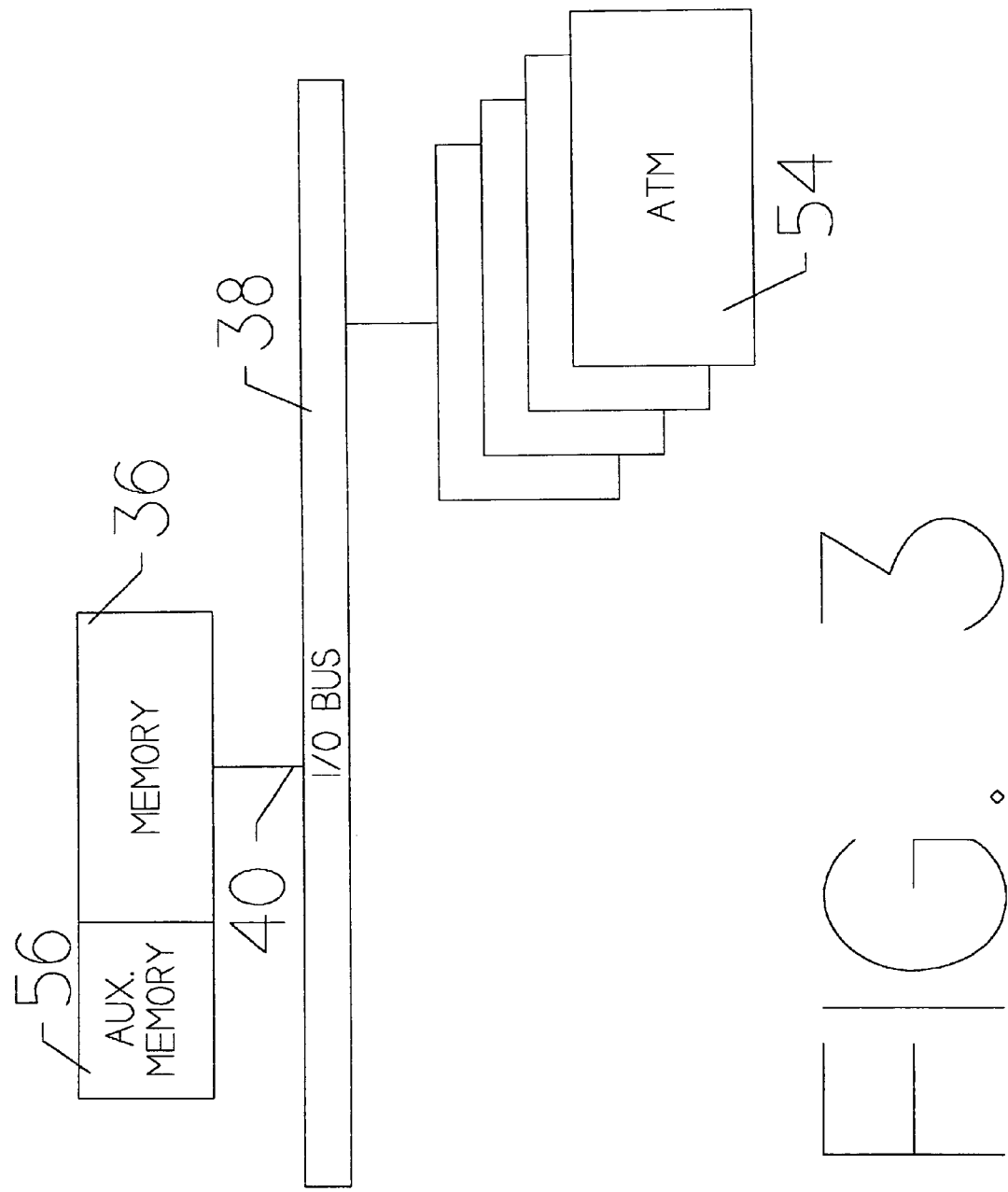
FIG. 3 is a schematic diagram showing the generation of a video stream from spooled data within a memory subsystem.

FIG. 3 is a schematic diagram showing spooling of high volume digitized video program. For those programs having a high user demand, it is much more efficient to spool the program files from random access memory rather than mass storage disk systems. In this context, high volume means a high probability that the given program will be in use during high service volume periods. That means that there will need to be random access storage allocated to the storage of that given program during peak memory demand. As a result, the system should simply allocate random access storage to that given program. Very popular, recent movies are typical of such high volume programs.

If a program is a high volume program, it is preferably stored in auxiliary memory 56. Upon request, software residing in memory 36 directs the storing of data from auxiliary memory 56 and transferring it via path 40 and I/O bus 38 to ATM interface 54. It should be noted that this is significantly more efficient than the storing operation shown in FIG. 2, since the video data only needs to be read out of memory instead of having to be loaded from disk each time the data is used. Furthermore, there is no additional cost if a program is of sufficiently high volume that the required random access memory must be allocated to the program anyway.

Figure 4:
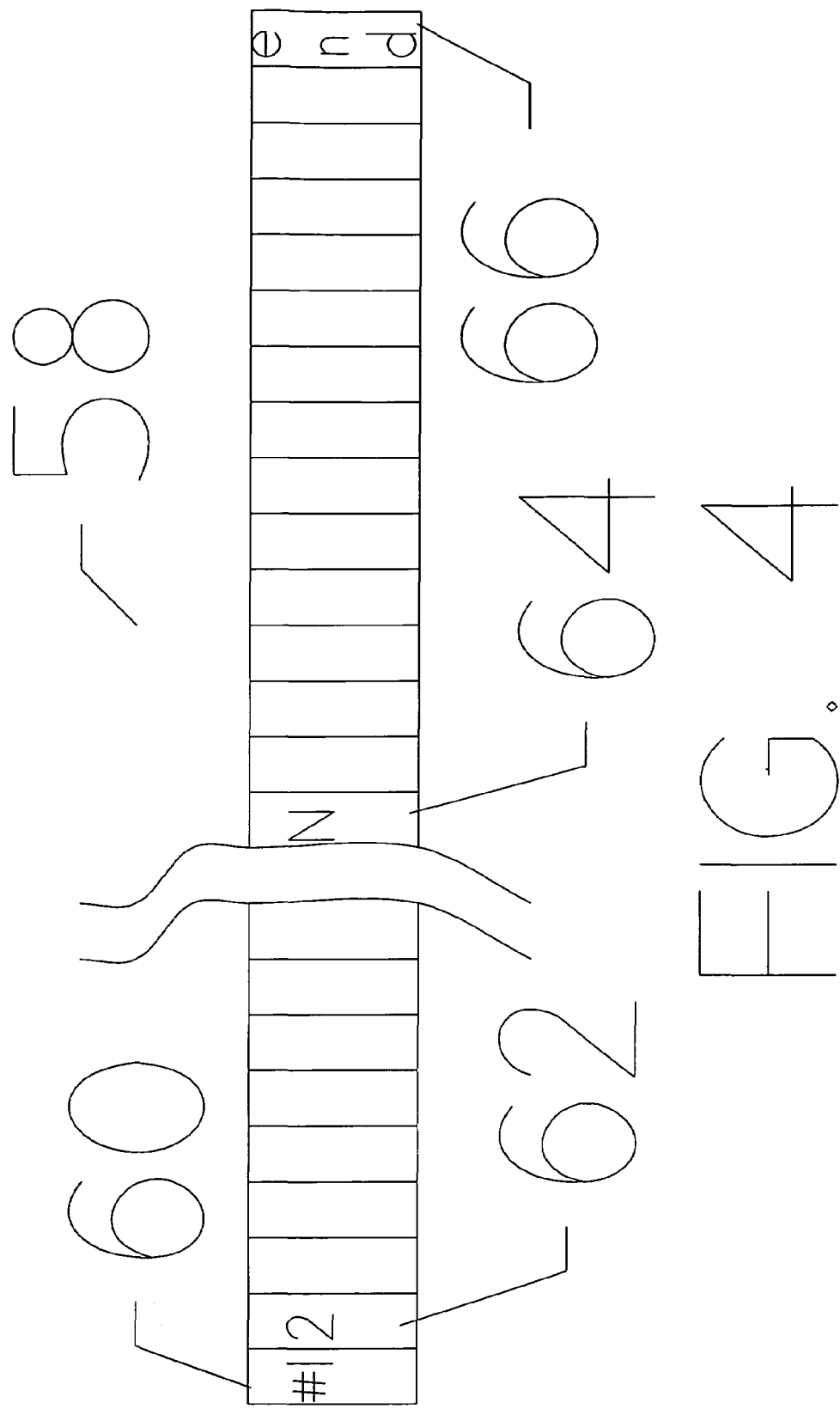
FIG. 4 is a schematic diagram showing video streaming as synchronized on one minute boundaries.

FIG. 4 is a schematic diagram 58 showing the synchronization of a given video program around one minute time slots. In concept, the present invention provides subscribers with video on demand. However, as a practical matter, by synchronizing multiple users around one minute time slots, the maximum number of transmissions to all users of the given video program cannot exceed 60 per hour of programming and 120 for a two hour standard video program. That means that for a given high volume program (which may be requested by hundreds or even thousands within the length of time to view the program) each requester is assigned to an appropriate time slot.

First time slot 60 provides the first minute of video programming to one or more requesters. During one minute time slot 62, the initial requesters receive the second minute of programming, and one or more requesters may be starting with the first minute of programming. At the nth time slot 64, the initial requesters are viewing the nth minute of programming, the second group of requesters is viewing the n−1 minute of programming, and the nth group of requesters is viewing the first minute of programming. At final time slot 66, the initial requesters are viewing the final minute of programming, the second group of requesters is viewing the second to last minute of programming, and a new group of requesters is viewing the initial minute of programming.

The reduction in total data requirements utilizing these one minute time slots is substantial. Commonly assigned U.S. Pat. No. 5,583,561, issued to Baker et al., incorporated herein by reference, discusses this feature in greater detail. The total delay to a requester is no more than one minute and will average one half minute, making the process perfectly acceptable and barely noticeable to the subscribers.

Figure 5:
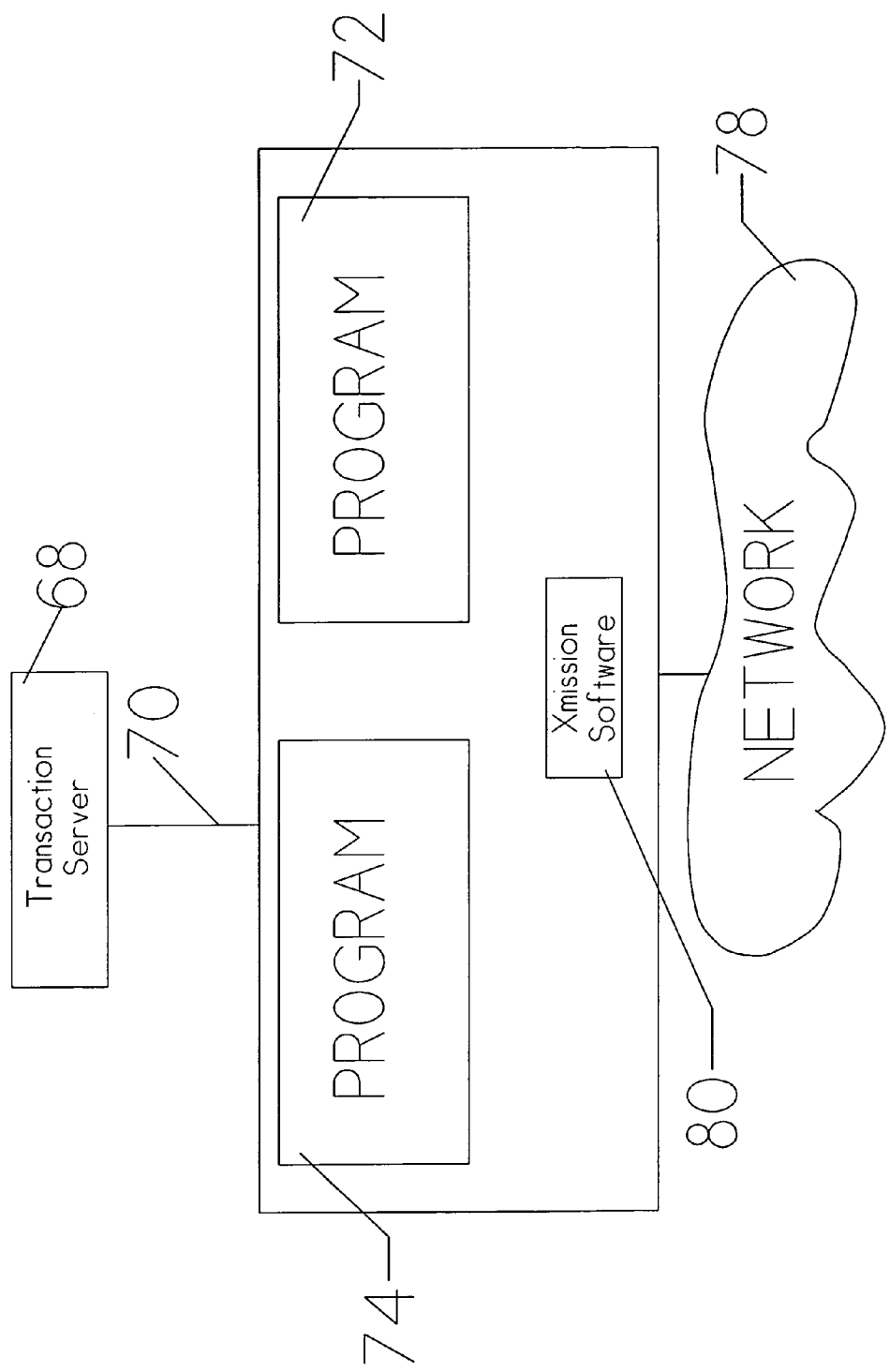
FIG. 5 is a schematic diagram showing operation of a video server platform.

FIG. 5 is a schematic diagram of a single industry compatible, Windows NT based video server platform. The video server subsystem is composed of a number of separate and largely independent video server platforms. Each is configured to have a maximum memory configuration and maximum I/O configuration. Digitized video programming data in the MPEG-2 format are moved from transaction server 68 via interconnect 70 into the assigned video server platform. Program 74 and program 72 are shown. These programs are place onto network 78 under control of transmission control software 80 for transfer to the requesting subscriber(s). For a given program being sent to a single user, transmission control software 80 simply retrieves the video data from memory in a sequential fashion at 3 mbits/second and places it on network 78.

Figure 6:
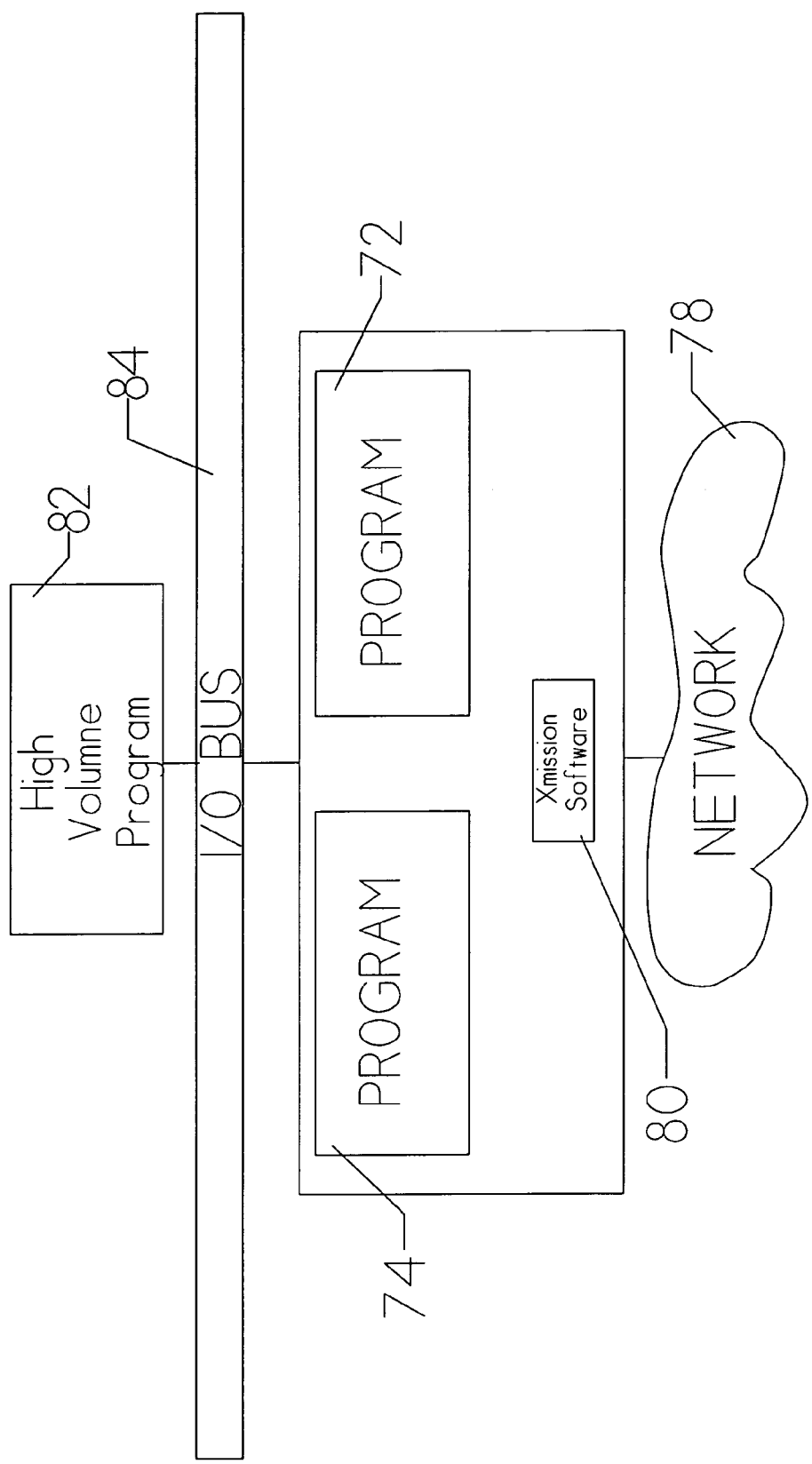
FIG. 6 is a schematic diagram showing video streaming of multiple programs from a single video server platform.

FIG. 6 is a schematic diagram showing transfer of high volume program 82 into the video server platform of FIG. 5. The transfer is performed by the transaction server as discussed above. The transferred data is transferred to the video server platform via I/O bus 84 Up to ten programs can be stored and streamed from a single video server For simplicity, only one video server is shown. For a view of multiple video servers within a system, refer to FIG. 1. All other referenced elements are as previously described.

Figure 7:
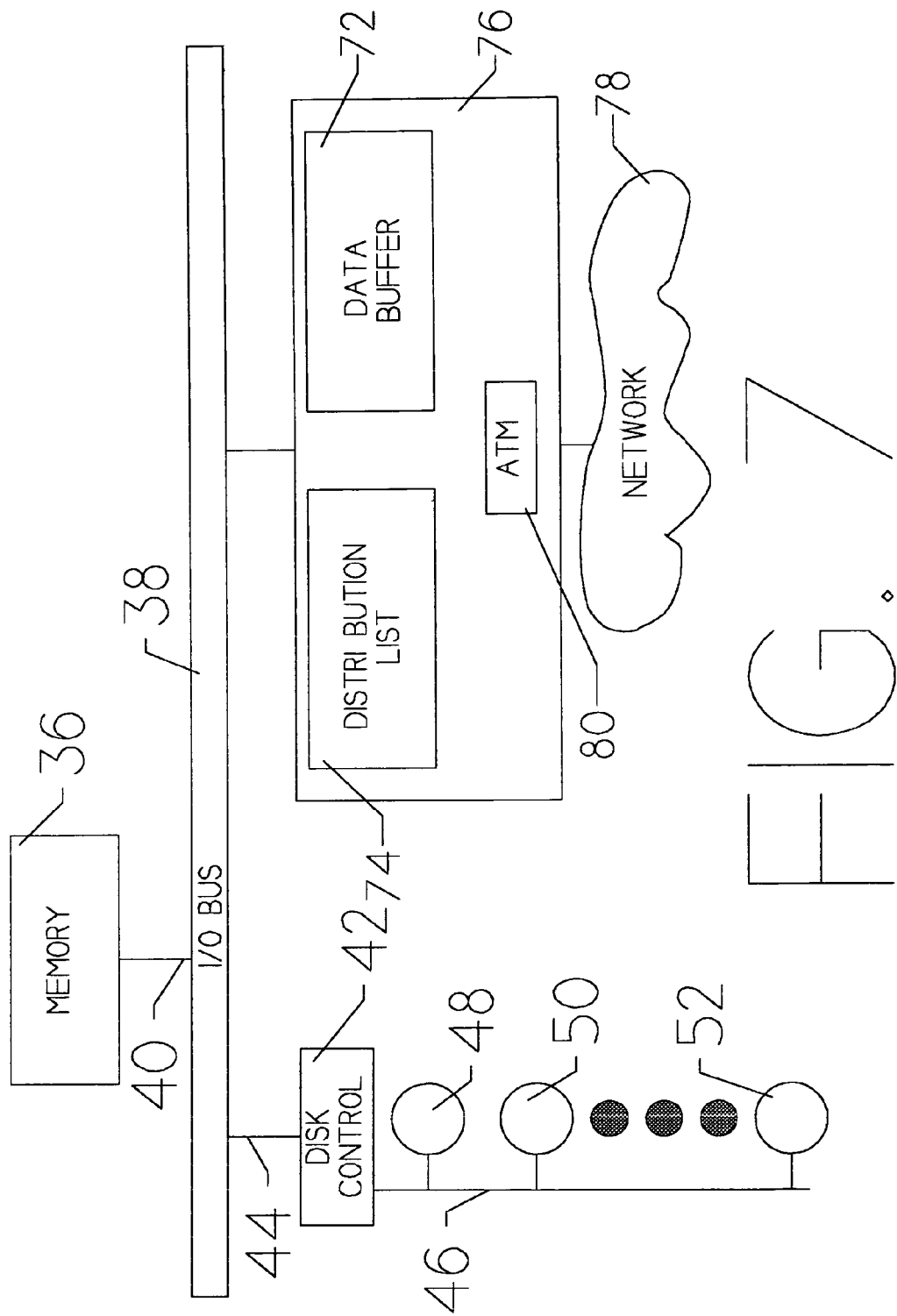
FIG. 7 is a schematic diagram showing video streaming from video programming data spooled on disk drive mass storage units.

FIG. 7 is a schematic diagram showing the spooling of low to moderate volume digitized video program data. For lower volume programs, storage on disk storage mass memory may be appropriate. A low volume video program is one in which it is highly unlikely that more than one request is received during the runtime of the video program. Therefore, the servicing of the request is most probably an index sequential task for retrieving the data and transmitting it to the user. This is readily distinguishable from the high volume video programs for which transmissions within multiple and perhaps many of the one minute time slots is expected (see also FIG. 4). These programs are spooled to the video server platform as shown. The remaining referenced elements are as previously described.

Figure 8:
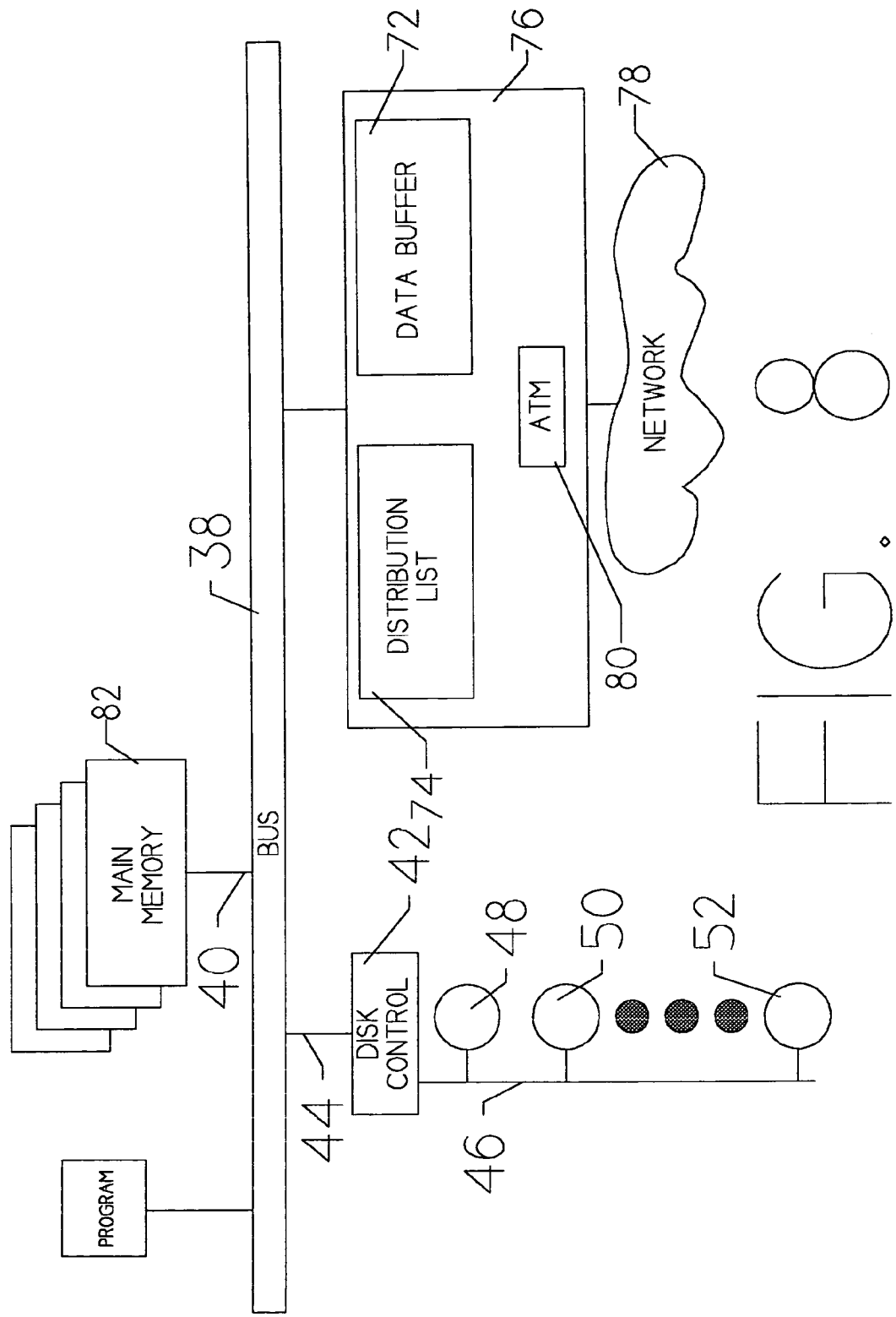
FIG. 8 is a schematic diagram showing video streaming from video programming data stored on both disk drive mass storage units and memory subsystems.

FIG. 8 is a schematic diagram showing transfer of low and high volume video programs to the same video server platform. All referenced elements are as previously described.

Figure 9:
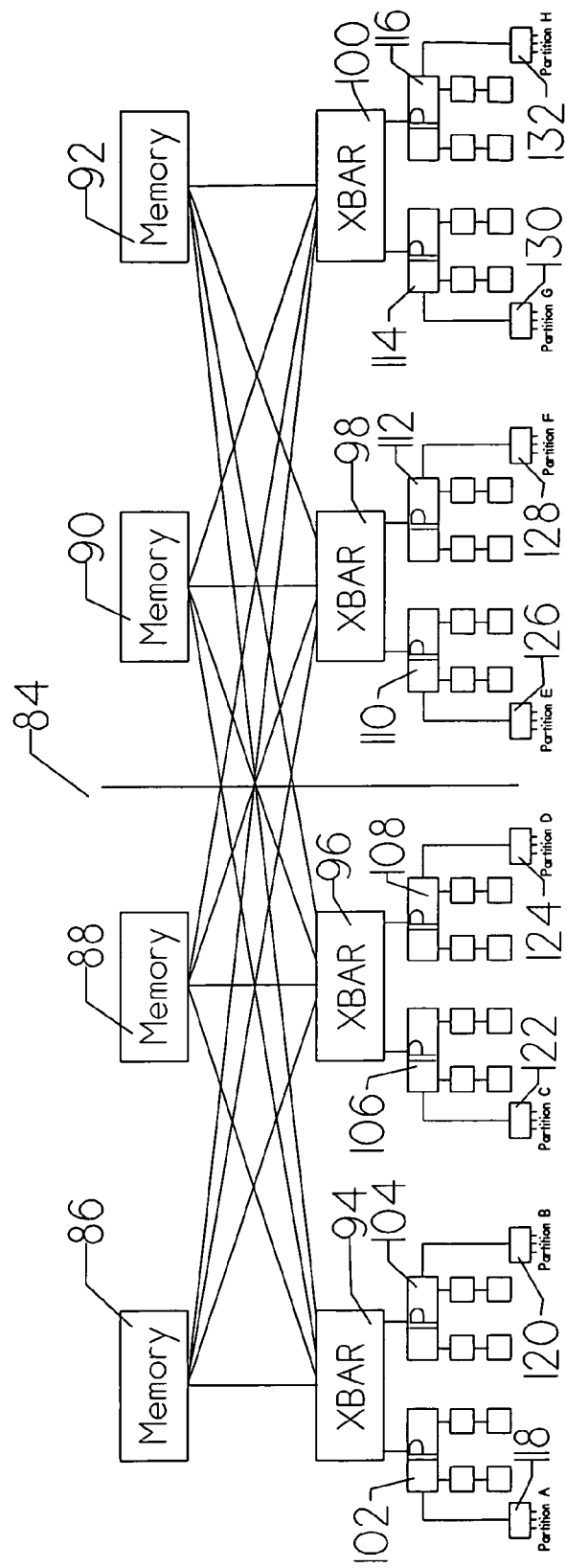
FIG. 9 is a block diagram of a maximum configuration video server.

FIG. 9 is a block diagram 84 of the maximum configuration of the transaction server of the preferred mode of the present invention. In this preferred mode, the video server is implemented using a current model Unisys mainframe system. In accordance with this product, the system is expandable from a single processor, single main memory, and single I/O controller to the maximum system shown.

Instruction processors 102, 104, 106, 108, 110, 112, 114, and 116 communicate with main memories 86, 88, 90, and 92 via crossbar interconnects 94, 96, 98, and 100. Each instruction processor may be coupled with up to four third-level caches, as shown. Direct Input/Output bridges 118, 120, 122, 124, 126, 128, 130, and 132 each handle video output functions. Each of the direct Input/Output bridges may be partitioned into separate partitions as shown. Additional description of partitioning may be found in U.S. patent application Ser. No. 08/779,472, filed Jan. 7, 1997, commonly assigned to the present invention and incorporated herein by reference.

Figure 10:
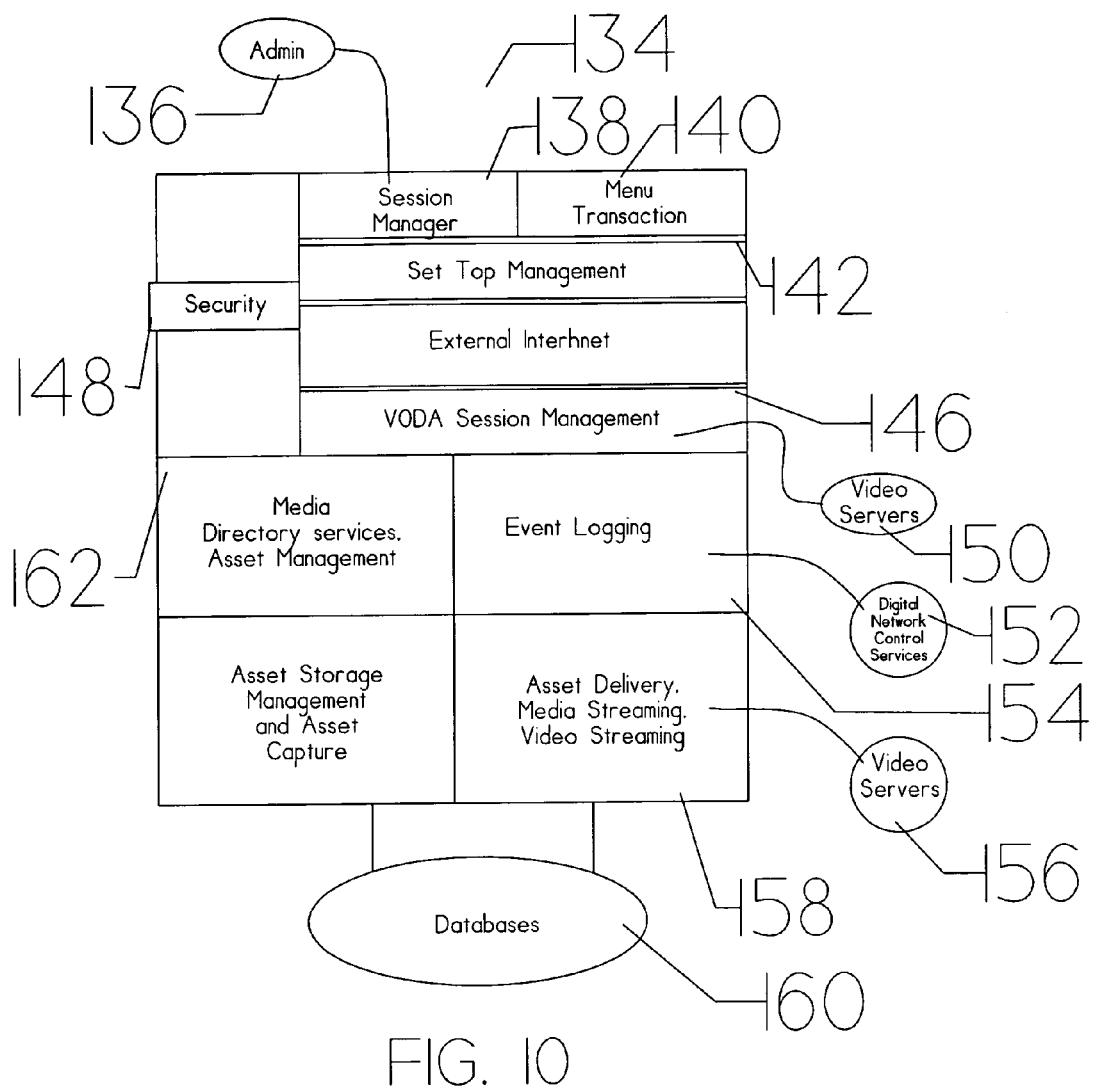
FIG. 10 is a detailed diagram of the operation of the transaction server of the preferred mode of the present invention.

FIG. 10 is a detailed functional diagram 134 of the transaction server. Communication with set top subscriber box 32 (see also FIG. 1) is managed by set top management module 142. Initial requests are selected by the user and honored through utilization of menu transaction module 140. After initiation of the servicing of a given request, control of the matter is given to session manager 138 for completion. Any and all communication with the transaction server are monitored by security module 148. Administration module 136 provides overall control of the transaction server.

The transaction server may be utilized to interface with the internet. The selected hardware and software system selected for the preferred mode provide internet server facilities in a commercially usable form. Video server session management module 146 provides the detailed functions (e.g., spooling of digital video programming) associated with the primary video on demand service. These control functions are directly interfaced to the video server subsystem via video server interface 150.

Event logging module 154 journals the functions performed. This log is made available to digital network control services 152. Media directory services and asset management module 162 provides long term control and asset management. Historical storage of these data is performed by asset storage management and asset capture.

In performing the actual video on demand service, the appropriate requested digitized video program is accessed from databases 160. It is spooled by asset delivery, video streaming module 158. The transfer is made via video server interface 156 (see also FIG. 1).

Figure 11:
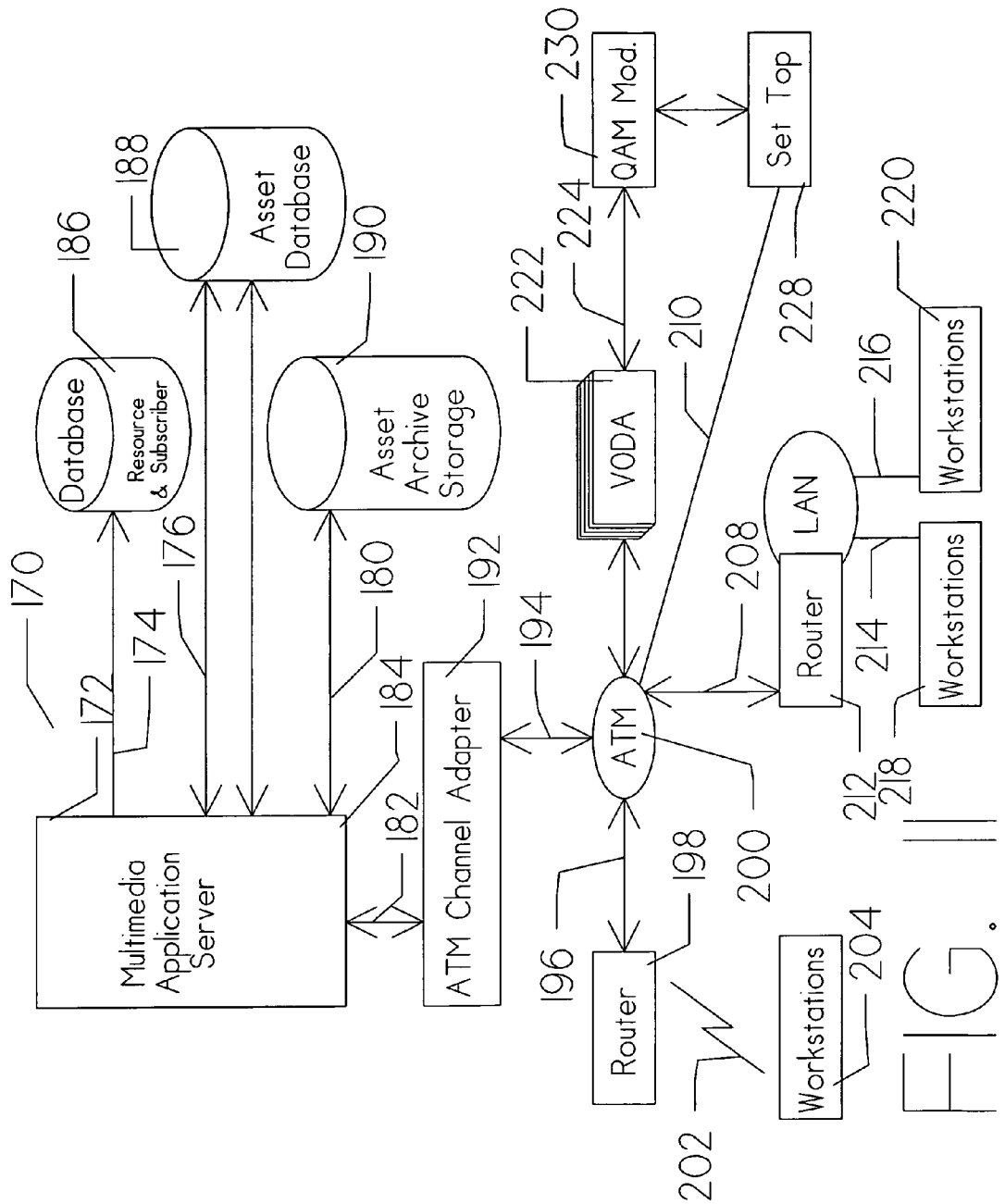
FIG. 11 is a system diagram of the VOD network showing the major data and message paths.

FIG. 11 is a diagram 170 of the overall VOD system with particular emphasis upon the data and message transfer paths. Multimedia Application Server (MAS) 172 accesses Resource and Subscriber Database 186 via interface 174 and Asset Database 188 via interface 176. Similarly, Asset Archive Storage 190 is accessed via interface 180.

Multimedia Application Server 172 interfaces with all other major system elements via path 182. ATM channel adapter 192 provides the link using the ATM protocol to interface 194 and ATM network 200.

ATM interfaces include path 196 to router 198 which communicates with workstations 204 via radio frequency path 202. Router 212, coupled via path 208, also interfaces to Local Area Network (LAN) and to workstations 218 and 220 via stubs 214 and 216, respectively. ATM 200 is also coupled directly to individual set top 228 via path 210 and to VODA 222 for streaming video along path 224 to QAM modulator 230, which supplies video to set top 228.

Figure 12:
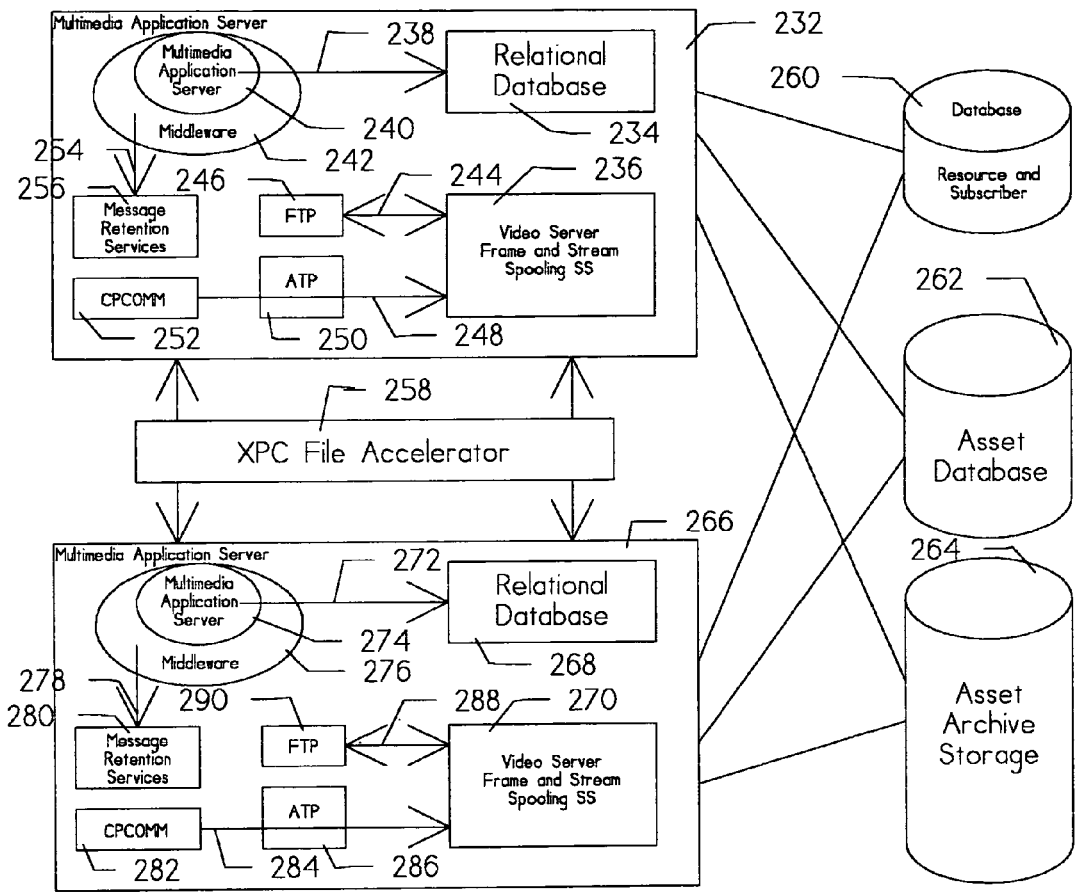
FIG. 12 is a system diagram showing a high reliability system employing redundancy.

FIG. 12 is a diagram showing a highly reliable video on demand system employing redundancy. The high reliability is achieved by having Multimedia Application Server (MAS) 232 completely duplicated as Multimedia Application Server 266. During peak loading, both can provide subscriber services. During periods of lesser loading, one or the other may be removed from service due to failure, maintenance, etc. XPC file accelerator 258 couples these two duplicate entities. Each Multimedia Application Server (i.e., 232 and 266) are redundantly coupled to Resource and Subscriber Database 260, Asset Database 262, and Asset Archive Storage 264.

Within Multimedia Application Server 232 (and corresponding MAS 266) are found the Multimedia Application Server core software 240 (and corresponding core software 274) which communicates via middleware 242 (and middleware 276). Communication is with Relational Database 234 (268) via path 238 (272), and Message Retention Services 256 (280) via path 254 (278). CPCOMM 252 (282) and ATP 250 (286) communicate directly with Video Server Frame and Stream Spooling 236 (270) via path 248 (284). Similarly, communication is had maintained with FTP 246 (290) via path 244 (288).

Figure 13:
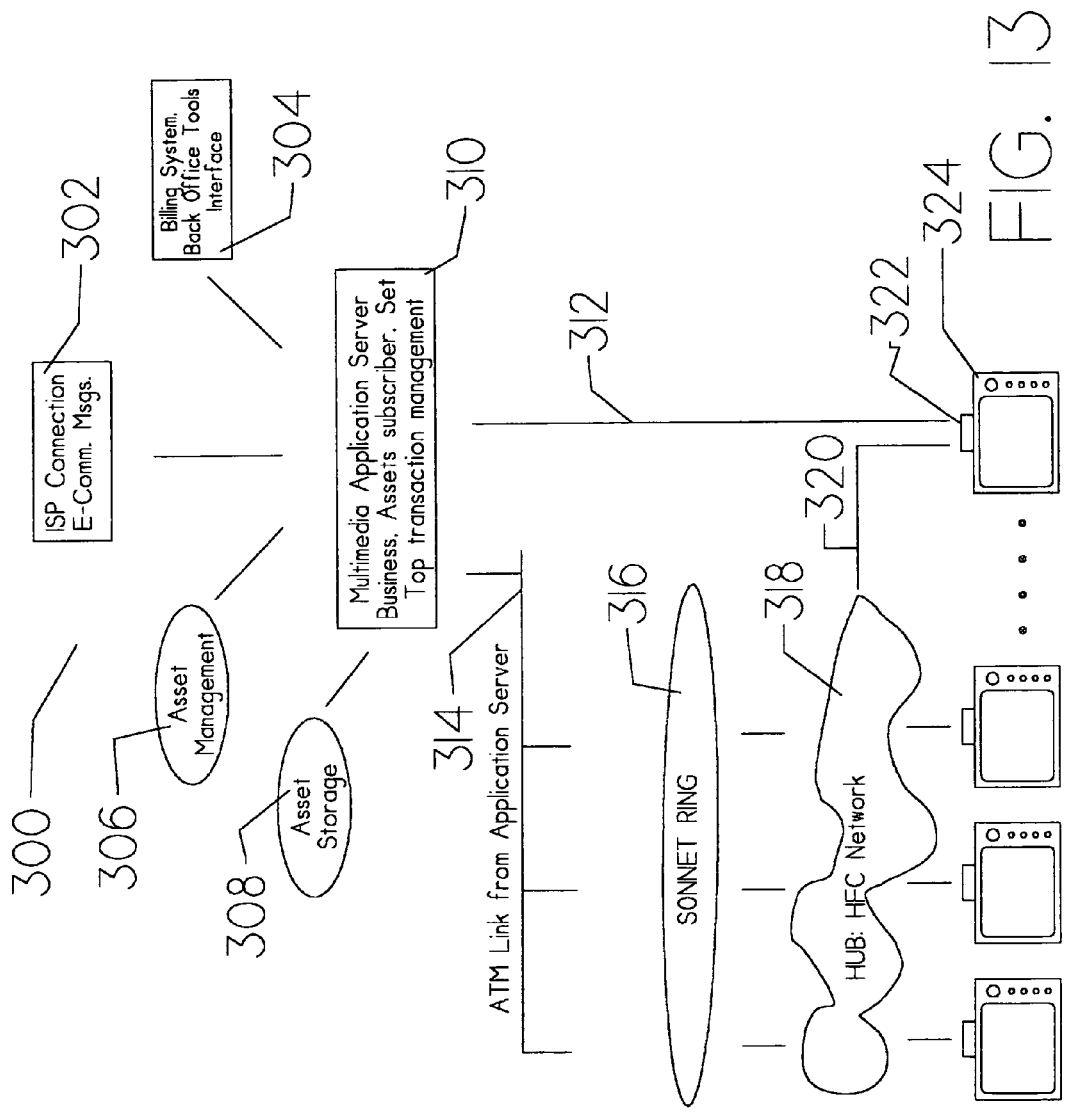
FIG. 13 is a system diagram showing major message paths.

FIG. 13 is diagram 300 which conceptually shows the major message paths in a Sonnet Ring configured system. Multimedia Application Server 310 directly communicates with system components: Asset Storage 308, Asset Management 306, ISP Connection 302 and Filling System 304.

Multimedia Application Server 310 receives messages directly from set top subscriber box 322 via path 312. It transfers messages to set top subscriber box 322 through path 314 to Sonnet Ring 316 to Hub 318 and then through cable 320. This path also provides the video for display on television receiver 324.

Figure 14:
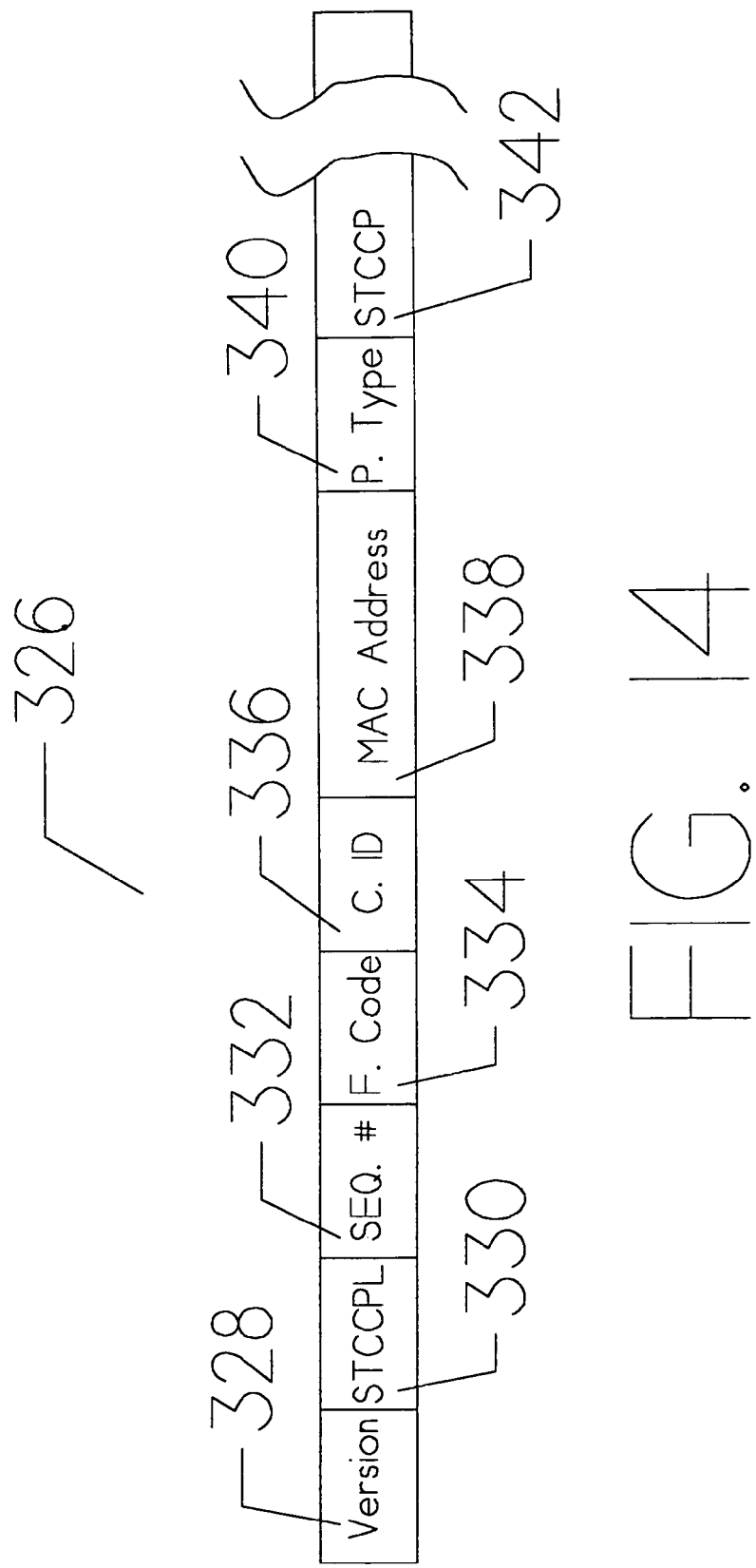
FIG. 14 is a diagram showing the basic message format.

FIG. 14 is a diagram 326 of the message format used to communicate between Multimedia Application Server 310 and set top subscriber box 322 (see also FIG. 13). Field 328 contains a four byte integer giving the version level. The current version is 2.

Field 330 is designated Set Top Command and Control Protocol (STCCPL). It is a four byte integer which specifies the length in bytes of variable length field 342. Field 332 is a four byte integer which provides the sequence number. This sequence number permits the Multimedia Application Server and set top subscriber box to synchronize message traffic by establishing the order in which messages have been generated. The sequence number is created by incrementing the sequence number of the previous message. For those messages which must be acknowledged (see below), the sequence number permits coordinating messages and acknowledgments.

The basic function code is specified in the four byte integer of field 334. These function codes are defined in more detail below. The Multimedia Application Server defines a unique four byte integer which is inserted into field 336. This is defined as the Connection ID. Field 338 provides for the entry of eight one byte integers. In the preferred embodiment, only the first five integers are used to uniquely address one set top subscriber box within a network. The remaining three one byte integers are left blank.

Field 340 is the packet type. It is specified as a four byte integer. The packet type is undefined for messages sent from a set top subscriber box to the Multimedia Application Server. For every message the Multimedia Application Server receives, it sends a response back to the set top subscriber box containing the STCCP output. This packet type is given the value of 1. An unsolicited administrative message sent from the Multimedia Application Server to the set top subscriber box which does not require an acknowledgment is defined as packet type 2. A similar message requiring an acknowledgment is defined as packet type 3.

Variable length field 342 may be from 0 to 952 bytes in length. The length is specified by field 330. This provides great flexibility in creating new and unique messages for specific occasions.

FIG. 15 is a table showing the definition of the basic function codes to be entered into field 334 (see also FIG. 14). The function code of 1 is used to indicate to the Multimedia Application Server that a particular set top subscriber box has been switched on.

Messages sent from the Multimedia Application Server to one or more set top subscriber boxes are assigned the function code of 2. A message having a function code of 3 notifies the Multimedia Application Server that the corresponding set top subscriber box has been powered down.

The set top subscriber box acknowledges messages from the Multimedia Application Server using a function code of 4. Reinitialization of a set top subscriber box is identified by a function code of 5.

Having thus describe the preferred embodiments in detail, those of skill in the art will be readily able to use the teachings found herein to make and use yet other embodiments within the scope of the claims appended hereto.

What is claimed is:

1. An apparatus for delivering video on demand programming from a multimedia application server having a first hardware and software architecture optimized to provide a low cost approach to a wide and highly expandable variety of functions to a set top subscriber box comprising:
   a. a temporary memory responsively coupled to said multimedia application server into which said multimedia application server spools a selected video program;
   b. a plurality of video servers each having a second hardware and software architecture optimized to handle high input/output rates which is different from said first hardware architecture responsively coupled to said temporary memory wherein one of said plurality of video servers selected by said multimedia application server streams said video program from said temporary memory;
   c. a network responsively coupled to said video server which delivers said video program as streamed by said video server to said set top subscriber box;
   d. a separate administrative message path responsively coupled to said set top subscriber box and said multimedia application server; and
   e. a message generated by said set top subscriber box and transferred from said set top subscriber box to said multimedia application server via said separate administrative message path, wherein said message further comprises a message length field located within said message which indicates a length for said message, and a message sequence number which identifies said message within a plurality of messages,
   f. a response message generated by said multimedia application server in response to receipt of said message and transferred via separate administrative path to said set top subscriber box.

2. An apparatus according to claim 1 wherein said message requests selection of and corresponds to said video program.

* * * * *